(12) United States Patent
Khekale (10) Patent No.: US 11,828,526 B2
(45) Date of Patent: *Nov. 28, 2023

(54) ANTI-ROLLING ICEBOX GASKET FOR REFRIGERATOR SWING DOORS

(71) Applicant: WHIRLPOOL CORPORATION, Benton Harbor, MI (US)

(72) Inventor: Ishan Subhash Khekale, St. Joseph, MI (US)

(73) Assignee: Whirlpool Corporation, Benton Harbor, MI (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/959,361

(22) Filed: Oct. 4, 2022

(65) Prior Publication Data

US 2023/0023280 A1 Jan. 26, 2023

Related U.S. Application Data

(63) Continuation of application No. 16/299,629, filed on Mar. 12, 2019, now Pat. No. 11,525,621.

(60) Provisional application No. 62/641,907, filed on Mar. 12, 2018.

(51) Int. Cl.
*F25D 23/00* (2006.01)
*F25D 23/08* (2006.01)
*F25D 23/02* (2006.01)
*F25D 21/04* (2006.01)
*F25C 5/20* (2018.01)

(52) U.S. Cl.
CPC ......... *F25D 23/087* (2013.01); *F25D 23/028* (2013.01); *F25C 5/22* (2018.01); *F25D 21/04* (2013.01); *F25D 2201/00* (2013.01); *F25D 2323/02* (2013.01)

(58) Field of Classification Search
CPC ...... F25D 23/087; F25D 23/028; F25D 21/04; F25D 2201/00; F25D 2323/02; F25D 2317/062; F25D 2317/061; F25D 2317/067; F25C 5/22; F16J 15/021; F16J 15/022; F16J 15/06; F16J 15/061; F16J 15/02
USPC ...................... 49/475.1; 312/296, 405, 405.1
See application file for complete search history.

(56) References Cited

U.S. PATENT DOCUMENTS

| 3,099,259 A | 7/1963 | Newell, Jr. |
| 3,117,352 A * | 1/1964 | Reahard ............... F25D 23/087 49/498.1 |
| 3,399,005 A | 8/1968 | Macdonnell |
| 5,093,968 A | 3/1992 | Rojdev et al. |

(Continued)

FOREIGN PATENT DOCUMENTS

| CA | 2545021 A1 | 11/2006 |
| CN | 106838316 A | 6/2017 |

(Continued)

*Primary Examiner* — Janet M Wilkens
(74) *Attorney, Agent, or Firm* — Price Heneveld LLP (57) ABSTRACT

A gasket is positioned on an icebox within a refrigerator appliance. The gasket includes a first lateral edge spaced apart from a second lateral edge. The first lateral edge has a first height and the second lateral edge has a second height. The first height is greater than the second height. A longitudinal edge extends between and is integrally formed with the first and second lateral edges. The longitudinal edge tapers from the first height to the second height. The second lateral edge is positioned proximate a hinge assembly of an appliance door.

19 Claims, 7 Drawing Sheets

(56) References Cited

U.S. PATENT DOCUMENTS

| | | | |
|---|---|---|---|
| 5,407,156 A * | 4/1995 | Rossman | A47B 21/0371 248/118.1 |
| 7,306,235 B2 | 12/2007 | Roberts et al. | |
| 7,989,989 B2 | 8/2011 | Lust et al. | |
| 8,042,708 B2 | 10/2011 | Jeong et al. | |
| D694,295 S | 11/2013 | Bowen et al. | |
| 8,720,906 B2 | 5/2014 | Roberts et al. | |
| 8,733,763 B2 | 5/2014 | Roberts et al. | |
| 8,794,014 B2 | 8/2014 | Kulkarni et al. | |
| 9,341,402 B1 | 5/2016 | Loudermilk et al. | |
| 9,441,871 B2 | 9/2016 | Rupp | |
| 10,072,888 B2 | 9/2018 | Jeong et al. | |
| 10,458,693 B2 | 10/2019 | Jeong et al. | |
| 10,495,366 B2 | 12/2019 | Jeong et al. | |
| 10,627,152 B2 | 4/2020 | Ehninger et al. | |
| 10,670,320 B2 | 6/2020 | Lee et al. | |
| 10,976,091 B2 | 4/2021 | Kim | |
| 11,274,869 B2 | 3/2022 | Lee et al. | |
| 11,326,824 B2 | 5/2022 | Moertl et al. | |
| 11,378,322 B2 | 7/2022 | Jeong et al. | |
| 11,525,621 B2 * | 12/2022 | Khekale | F25D 23/087 |
| 2006/0201194 A1 | 9/2006 | Bowen et al. | |
| 2007/0024010 A1 | 2/2007 | Roberts et al. | |
| 2008/0156027 A1 | 7/2008 | Jeong et al. | |
| 2008/0307823 A1 | 12/2008 | Lee et al. | |
| 2009/0293501 A1 | 12/2009 | Kulkarni et al. | |
| 2010/0262295 A1 | 10/2010 | Lee | |
| 2011/0146331 A1 | 6/2011 | Moon et al. | |
| 2012/0167611 A1 | 7/2012 | Weirich et al. | |
| 2016/0047591 A1 | 2/2016 | Jeong et al. | |
| 2016/0054044 A1 | 2/2016 | Jeong et al. | |
| 2017/0051966 A1 | 2/2017 | Powell | |
| 2018/0017310 A1 | 1/2018 | Jeong et al. | |
| 2019/0024796 A1 | 1/2019 | Amano | |
| 2019/0277557 A1 | 9/2019 | Khekale | |
| 2021/0041158 A1 | 2/2021 | Frattini et al. | |
| 2021/0172666 A1 | 6/2021 | Moertl et al. | |
| 2021/0199364 A1 | 7/2021 | Kim | |
| 2022/0065521 A1 | 3/2022 | Shivappa Thenehalli | |
| 2022/0154991 A1 | 5/2022 | Lee et al. | |

FOREIGN PATENT DOCUMENTS

| | | | |
|---|---|---|---|
| CN | 106885420 A | | 6/2017 |
| DE | 4136625 A1 | | 3/1993 |
| DE | 20120131 U1 | | 6/2002 |
| DE | 102016218651 A1 | | 3/2018 |
| EP | 3343138 | * | 7/2018 |
| EP | 3483533 A2 | | 5/2019 |
| EP | 3410044 B1 | | 12/2019 |
| KR | 1020160095919 A | | 8/2016 |
| KR | 101800549 B1 | | 12/2017 |
| WO | 2007016206 A2 | | 2/2007 |
| WO | 2007016206 A3 | | 5/2007 |
| WO | 2017039333 A1 | | 3/2017 |
| WO | 2017154615 A1 | | 9/2017 |
| WO | 2021141412 A1 | | 7/2021 |

* cited by examiner

ANTI-ROLLING ICEBOX GASKET FOR REFRIGERATOR SWING DOORS

CROSS-REFERENCE TO RELATED APPLICATION

This application is a continuation of and claims priority to U.S. patent application Ser. No. 16/299,629, filed on Mar. 12, 2019, now U.S. Pat. No. 11,525,621, entitled "ANTI-ROLLING ICEBOX GASKET FOR REFRIGERATOR SWING DOORS," which claims priority to and the benefit under 35 U.S.C. § 119(e) of U.S. Provisional Patent Application No. 62/641,907, filed on Mar. 12, 2018, entitled "ANTI-ROLLING ICEBOX GASKET FOR REFRIGERATOR SWING DOORS," the entire disclosure of each which is hereby incorporated herein by reference.

FIELD OF DISCLOSURE

The present device generally relates to a refrigerator door assembly, and more specifically, to a refrigerator door assembly including a tapered gasket disposed proximate an icebox.

BACKGROUND

It is common to use gaskets to seal areas where components of a refrigerator appliance are joined. However, when one of the components is disposed on a hinged door, the uniform height of a standard gasket results in one side of the gasket extending too far and rolling from the excess height. This causes frost from air leakage around the rolled edge. It is desired to design a gasket with a variation in height to allow sealing without having a rolled edge.

SUMMARY

In at least one aspect, a refrigerator door assembly comprises a refrigerator door operably coupled to a refrigerator appliance by a hinge assembly, an icebox disposed on the refrigerator door and defining a first opening, an air duct disposed within the refrigerator appliance defining a second opening, wherein the second opening is configured to communicate with the first opening when the refrigeration door is closed, and a gasket disposed about a periphery of one of the first opening and the second opening. The gasket comprises a first lateral edge having a first height, a second lateral edge having a second height, wherein the second height is less than the first height, and first and second longitudinal sides join the first lateral edge and the second lateral edge, wherein the first and second longitudinal sides are tapered from the first height to the second height.

In another aspect, a refrigerator appliance includes a cabinet defining a refrigeration compartment. A door is operably coupled with the cabinet by a hinge assembly and is movable between an open position and a closed position. An icemaker is positioned within the door. The icemaker includes an icebox defining a first opening. An air duct is positioned within the refrigeration compartment and is operably coupled with the cabinet. The air duct defines a second opening. The first opening is configured to be positioned in communication with the second opening when the door is in the closed position. A gasket is positioned about a periphery of one of the first opening and the second opening. The gasket includes a first lateral edge having a first height. A second lateral edge has a second height. The second height is less than the first height. The second lateral edge is positioned proximate the hinge assembly.

In another aspect, a refrigerator appliance includes a cabinet defining a refrigeration compartment. A door is operably coupled with the cabinet by a hinge assembly. The door includes an inner surface. An icebox is operably coupled with the inner surface. The icebox includes a front portion including a first sloped surface and defining a first opening. A body portion is integrally formed with the front portion and extends downward along the inner surface. An air duct is positioned at least partially within the refrigeration compartment. The air duct includes a second sloped surface positioned substantially parallel with the first sloped surface when the door is in a closed position. The second sloped surface defines a second opening. A gasket is positioned about a periphery of one of the first opening and the second opening. The gasket includes a longitudinal edge. The longitudinal edge tapers toward the hinge assembly.

In another aspect, a gasket is positioned on an icebox within a refrigerator appliance. The gasket includes a first lateral edge spaced apart from a second lateral edge. The first lateral edge has a first height, and the second lateral edge has a second height. The first height is greater than the second height. A longitudinal edge extends between and is integrally formed with the first and second lateral edges. The longitudinal edge tapers from the first height to the second height. The second lateral edge is positioned proximate a hinge assembly of an appliance door.

These and other features, advantages, and objects of the present device will be further understood and appreciated by those skilled in the art upon studying the following specification, claims, and appended drawings.

DETAILED DESCRIPTION OF EMBODIMENTS

Figure 2:
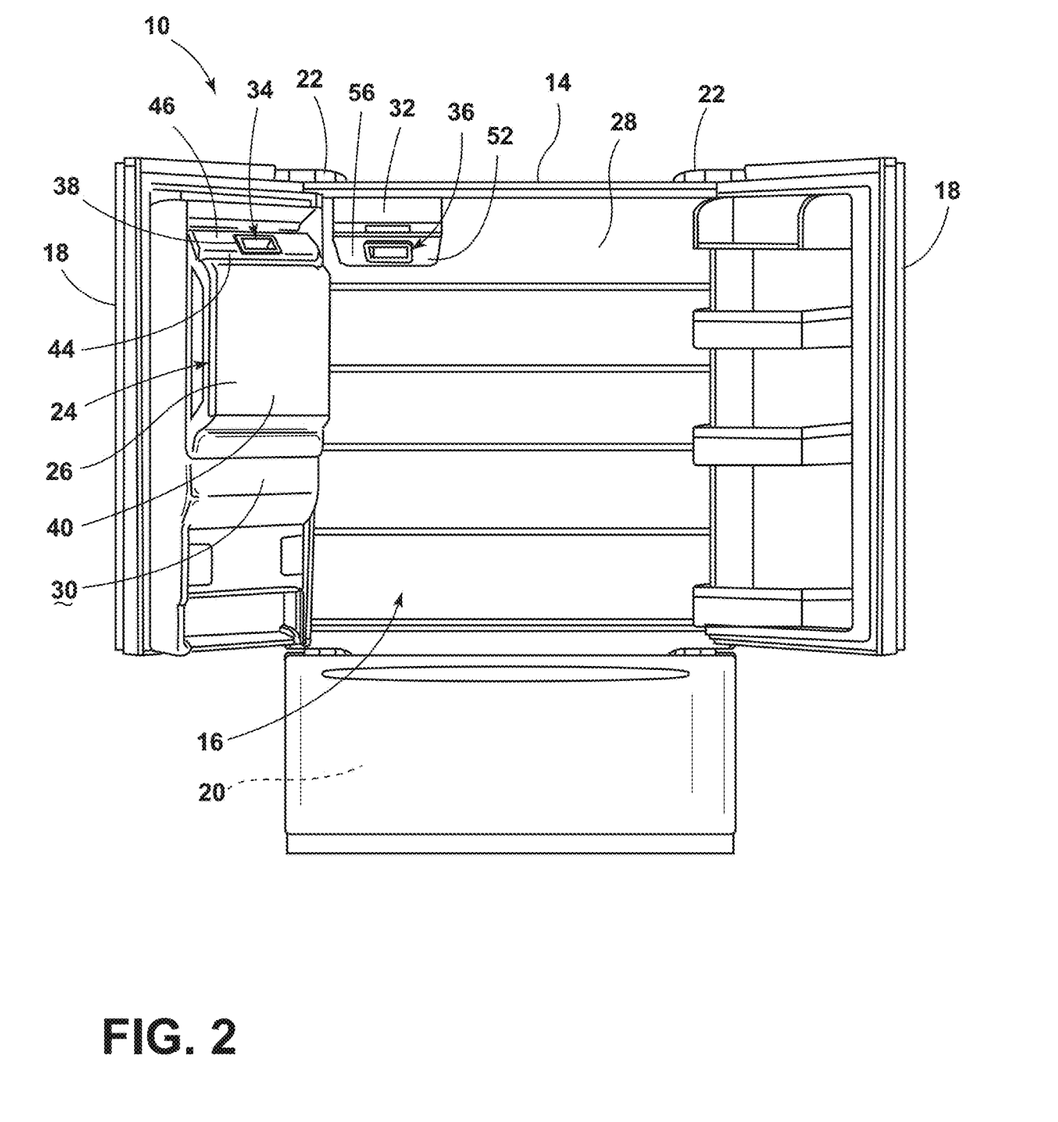
FIG. 2 is a front perspective view of the refrigerator appliance of FIG. 1 with the refrigerator doors in an open position.

For purposes of description herein, the terms "upper," "lower," "right," "left," "rear," "front," "vertical," "horizontal," and derivatives thereof shall relate to the concepts as oriented in FIG. 2. However, it is to be understood that the concepts may assume various alternative orientations, except where expressly specified to the contrary. It is also to be understood that the specific devices and processes illustrated in the attached drawings, and described in the following specification are simply exemplary embodiments of the inventive concepts defined in the appended claims.

Hence, specific dimensions and other physical characteristics relating to the embodiments disclosed herein are not to be considered as limiting, unless the claims expressly state otherwise.

In this document, relational terms, such as first and second, top and bottom, and the like, are used solely to distinguish one entity or action from another entity or action, without necessarily requiring or implying any actual such relationship or order between such entities or actions. The terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element proceeded by "comprises . . . a" does not, without more constraints, preclude the existence of additional identical elements in the process, method, article, or apparatus that comprises the element.

Referring now to FIGS. 1-5A, reference numeral 10 generally designates a refrigerator appliance including a cabinet 14 selectively closeable by a refrigerator door 18. The refrigerator door 18 is operably coupled to the refrigeration cabinet 14 by a hinge assembly 22. The hinge assembly 22 may be disposed on any portion of the edge of the refrigerator door 18 and may include a single hinge or a plurality of hinges, depending on the configuration of the refrigerator appliance 10.

Still referring to FIGS. 1-5A, an icebox 26 may be disposed on an inner surface 30 of the refrigerator door 18. It is contemplated that the icebox 26 may be disposed on any portion of the inner surface 30 without departing from the scope of the present disclosure. The icebox 26 is configured to engage with an air duct 32 disposed within the refrigeration cabinet 14. The air duct 32 is positioned within the refrigeration cabinet 14 to allow engagement with the icebox 26 when the refrigerator door 18 is in a closed position. The icebox 26 defines a first opening 34 configured to be in communication with a second opening 36 defined by the air duct 32. When the refrigerator door 18 is closed, a gasket 38 may be disposed on the icebox 26 about a periphery of the first opening 34. Alternatively, the gasket 38 may be disposed on the air duct 32 about a periphery of the second opening 36 without departing from the scope of the present disclosure.

Figure 1:
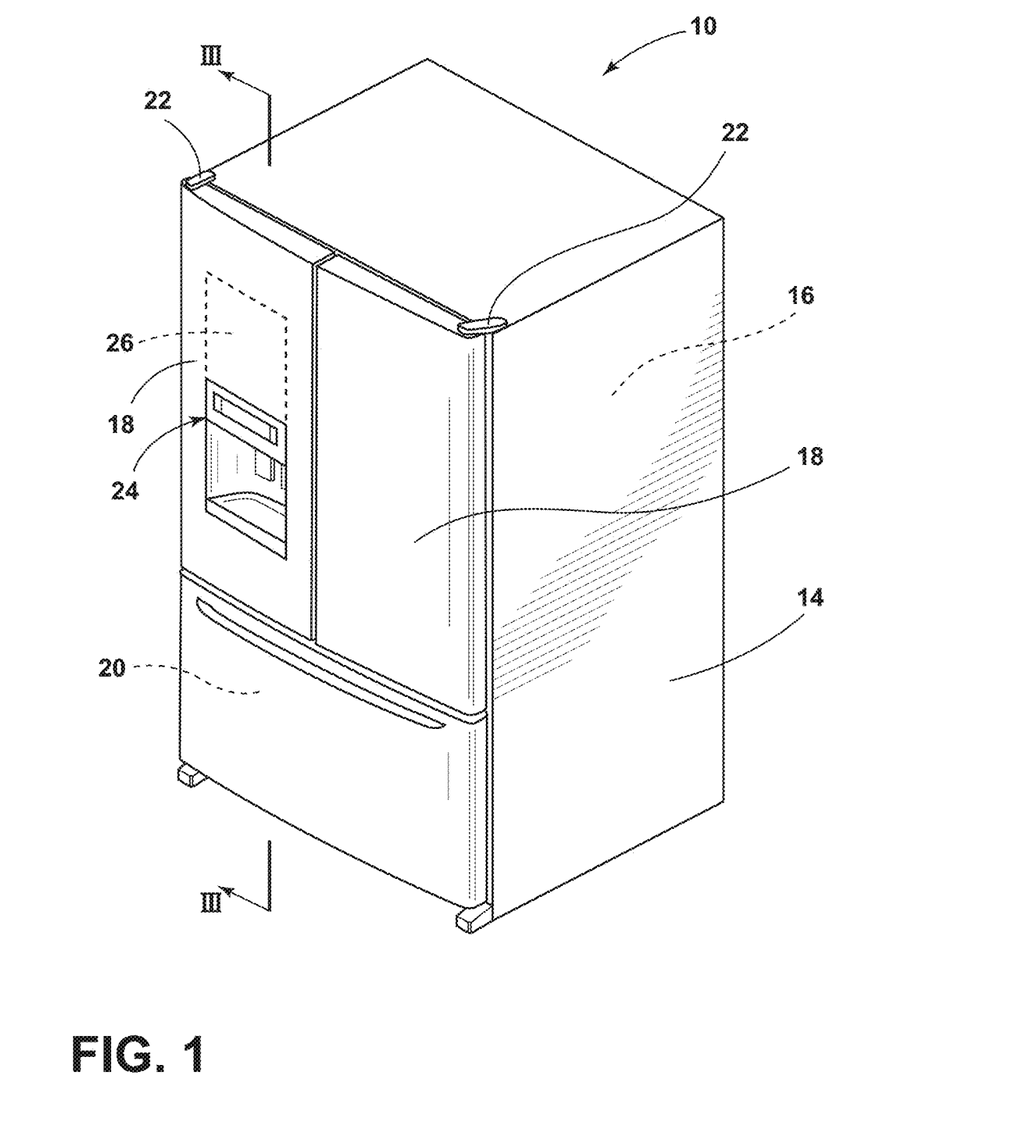
FIG. 1 is a side perspective view of a refrigerator appliance with a refrigerator door in a closed position.

Referring now to FIGS. 1 and 2, the refrigerator appliance 10 is shown including an icemaker 24. The icemaker 24 may be configured to provide an ice-making process that may be induced, carried out, stopped, and the ice harvested with little, or no, user input. FIGS. 1 and 2 generally show a refrigerator of the French-door bottom mount type, but it is understood that this disclosure could apply to any type of refrigerator, such as a side-by-side, two-door bottom mount, or a top-mount type refrigeration unit.

As shown in FIGS. 1 and 2, the refrigerator appliance 10 may include the cabinet 14. The cabinet 14 may define a refrigeration compartment 16 and a freezer compartment 20. The refrigeration compartment 16 may be configured to refrigerate consumables and may accordingly be kept at a temperature above the freezing point of water and generally below a temperature of from about 35° F. to about 50° F., more typically below about 38° F.

In various examples, the refrigerator appliance 10 may have a liner 28 coupled with the cabinet 14 to define the refrigeration compartment 16 and the freezer compartment 20. The refrigerator appliance 10 may have one or more doors 18 that provide selective access to the interior volume of the appliance 10 where consumables may be stored. It is appreciated that the refrigeration compartment 16 may only have one door 18.

Referring now to FIGS. 2-4A, the icemaker 24 may be positioned within the door 18 of the appliance 10. The icemaker 24 may be located at an upper portion of the door 18. The icemaker 24 may include the icebox 26. The icebox 26 may include a body portion 40 and a front portion 44. The body portion 40 may be integrally formed with the refrigerator door 18. The front portion 44 may also be integrally formed with the inner surface 30 of the refrigerator door 18 to create a continuous surface across the icebox 26. The front portion 44 may be operably coupled to the body portion 40 and may include a first sloped surface 46 inclined upward toward a top edge of the refrigerator door 18. In various examples, the body portion 40 may be covered by a door liner 100. The door liner 100 may define the inner surface 30 of the door 18. In other examples, the door liner 100 may be positioned over the inner surface 30 of the door 18. In still other examples, the body portion 40 and the front portion 44 of the icebox 26 may be formed by a cover 104 configured to fit over the icebox 26 and the icemaker 24 (see FIG. 5).

Figure 3:
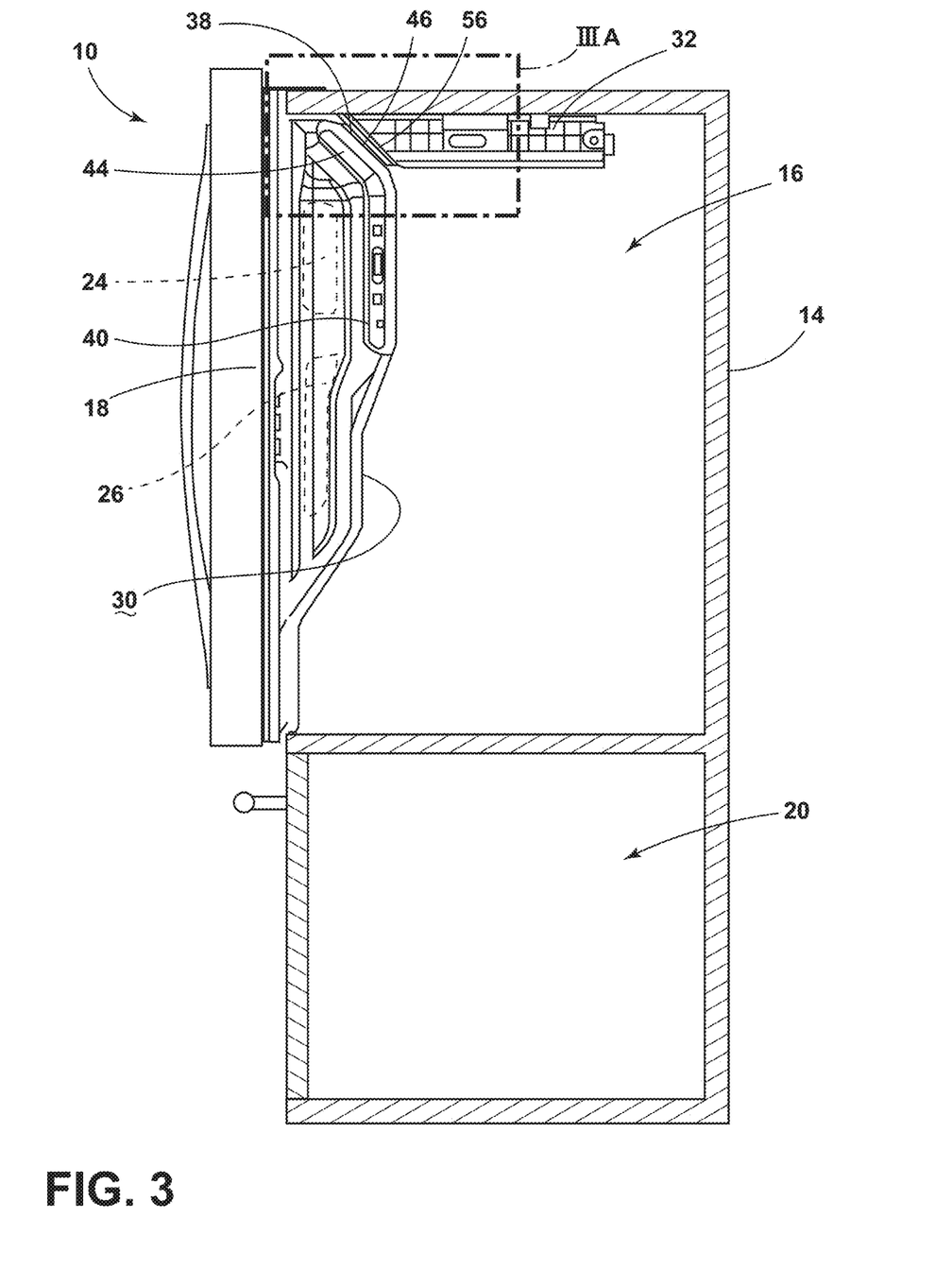
FIG. 3 is a cross-sectional view of an aspect of a refrigerator appliance of FIG. 1.
Figure 3A:
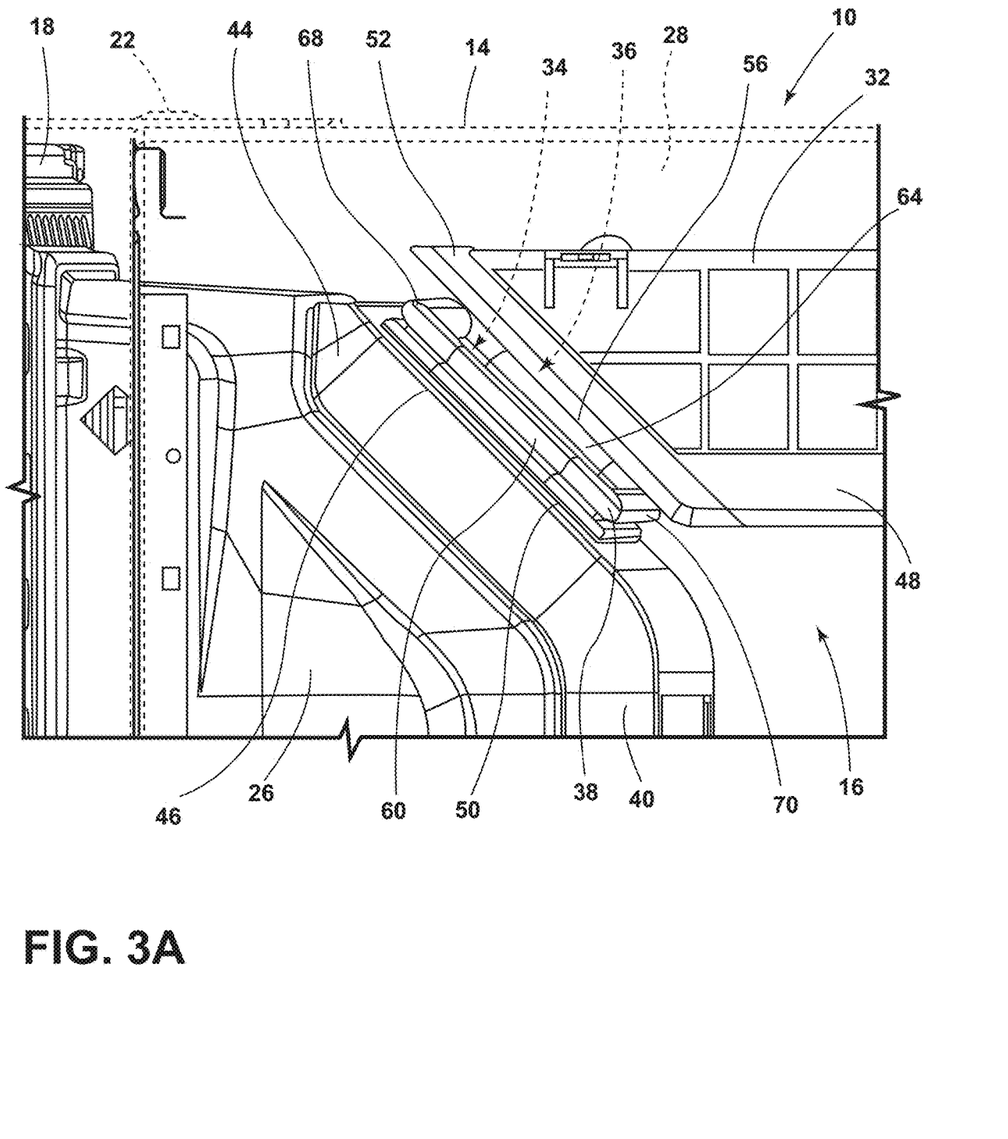
FIG. 3A is an enlarged cross-sectional view of FIG. 3, taken at area IIIA.
Figure 4:
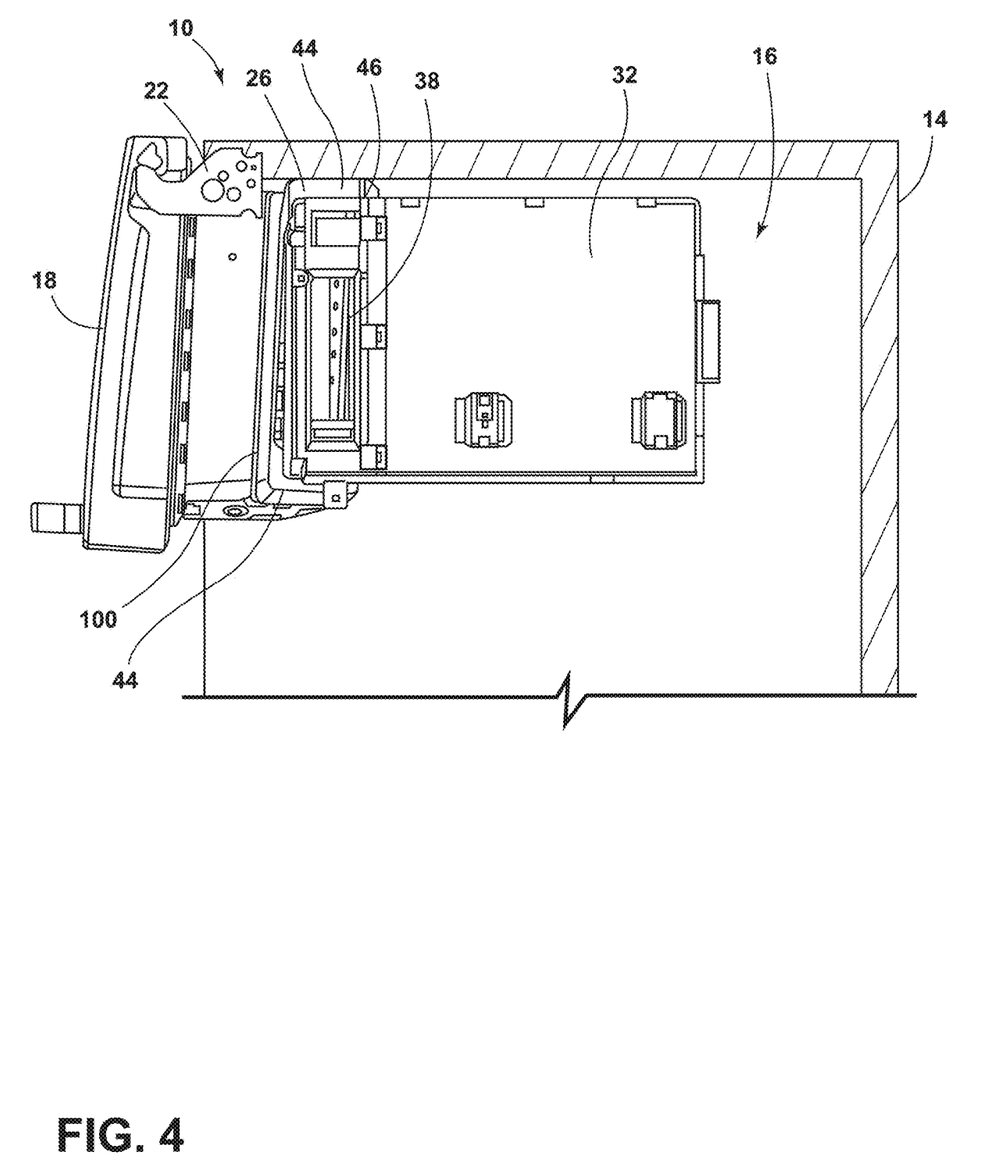
FIG. 4 is a cross-sectional plan view of an aspect of a refrigerator appliance having the refrigerator door ajar and between an open position and the closed position.
Figure 4A:
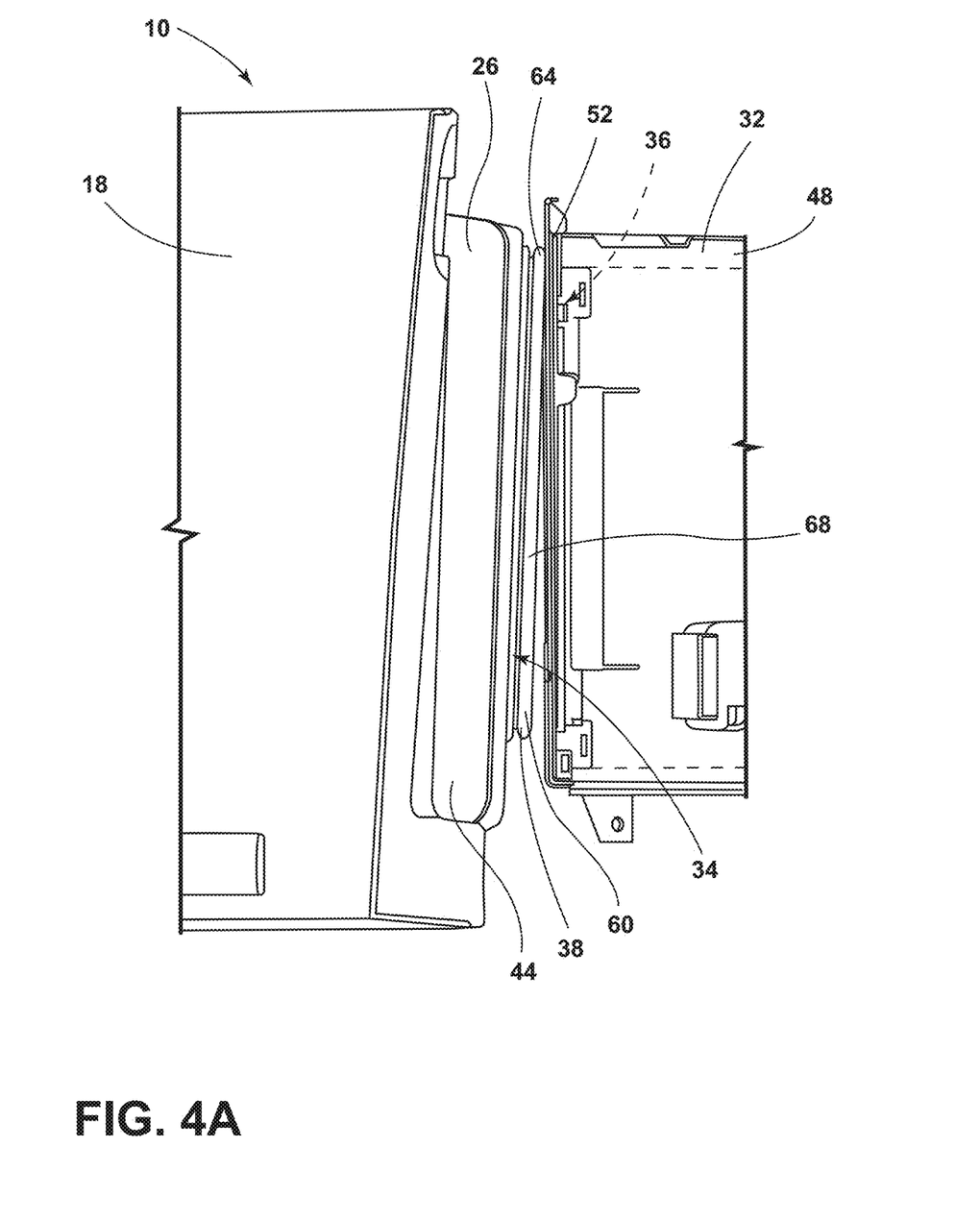
FIG. 4A is an enlarged top view of FIG. 4 illustrating a gasket assembly engaging with an air duct.

Referring now to FIGS. 3-4A, the front portion 44 defines the first opening 34. The first opening 34 may be generally rectangular and may include a guide 50 (see FIG. 5) configured to secure the gasket 38 about the periphery of the first opening 34. The first opening 34 may be configured to direct cooled air from the air duct 32 into an interior of the icebox 26 to lower the temperature for ice formation within the icemaker 24.

As shown in FIG. 2, the air duct 32 may be positioned within the refrigeration compartment 16 and may be at least partially coupled with the cabinet 14 and/or the liner 28 of the appliance 10. The air duct 32 may extend from a front of the cabinet 14 toward a rear of the cabinet 14 and may be positioned at substantially the same height as the front portion 44 of the icebox 26.

Referring again to FIGS. 3-4A, the air duct 32 may include a body portion 48 and a front portion 52, where the body portion 48 extends rearward of the front portion 52. As discussed above, the body portion 48 may be operably coupled to the refrigerator appliance 10 and may be disposed within the refrigeration cabinet 14 (see FIG. 2). The front portion 52 may be operably coupled to the body portion 48. In various examples, the front portion 52 may be positioned within the refrigeration compartment 16 of the cabinet 14 such that, when the door 18 of the appliance 10 is in the closed position, the icebox 26 of the icemaker 24 is received within the refrigeration compartment 16. The icebox 26 may extend a predetermined distance into the refrigeration compartment 16. The front portion 52 of the air duct 32 may be positioned to abut the front portion 44 of the icebox 26 when the door 18 is in the closed position and the icebox 26 is extending into the refrigeration compartment 16. It is contemplated that the air duct 32 may be recessed any distance into the appliance 10 to allow the front portion 44 of the icebox 26 to be fully received.

Referring again to FIGS. 2-4A, the front portion 52 of the air duct 32 may define the second opening 36 configured to communicate with the first opening 34 when the refrigerator door 18 is in the closed position. The second opening 36 may be similar in shape and size to the first opening 34 and may be configured to complement the first opening 34.

Referring again to FIGS. 3-4A, the front portion 52 of the air duct 32 may include a second sloped surface 56 which may be inclined to complement the first sloped surface 46 of the front portion 44 of the icebox 26. As discussed elsewhere herein, when the icebox 26 is received within the refrigeration compartment 16, the first sloped surface 46 of the front portion 44 of the icebox 26 may be positioned to abut or be in close proximity to the second sloped surface 56 of the air duct 32. The abutment of the first and second sloped surface 46, 56 is configured to facilitate the seal between the icebox 26 of the icemaker 24 and the air duct 32.

Figure 5:
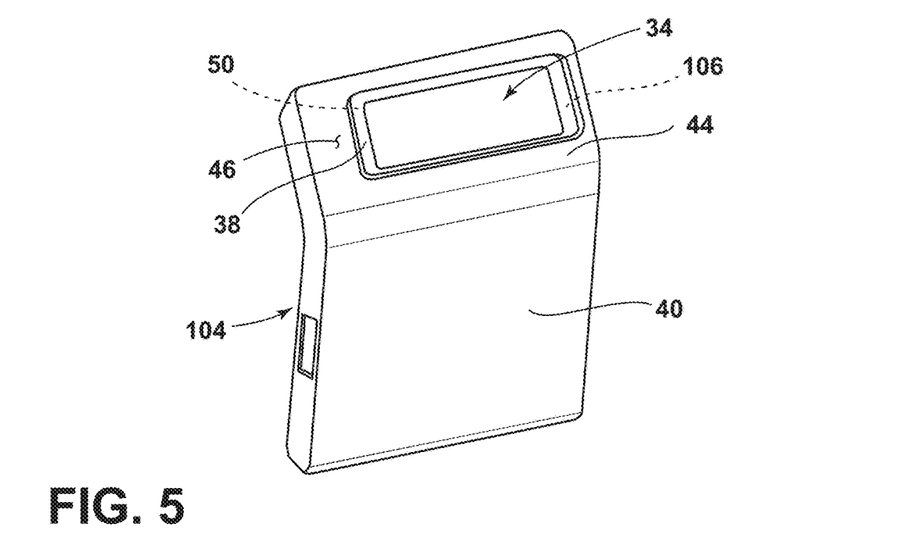
FIG. 5 is a side perspective view of an icebox and a gasket assembly.
Figure 5A:
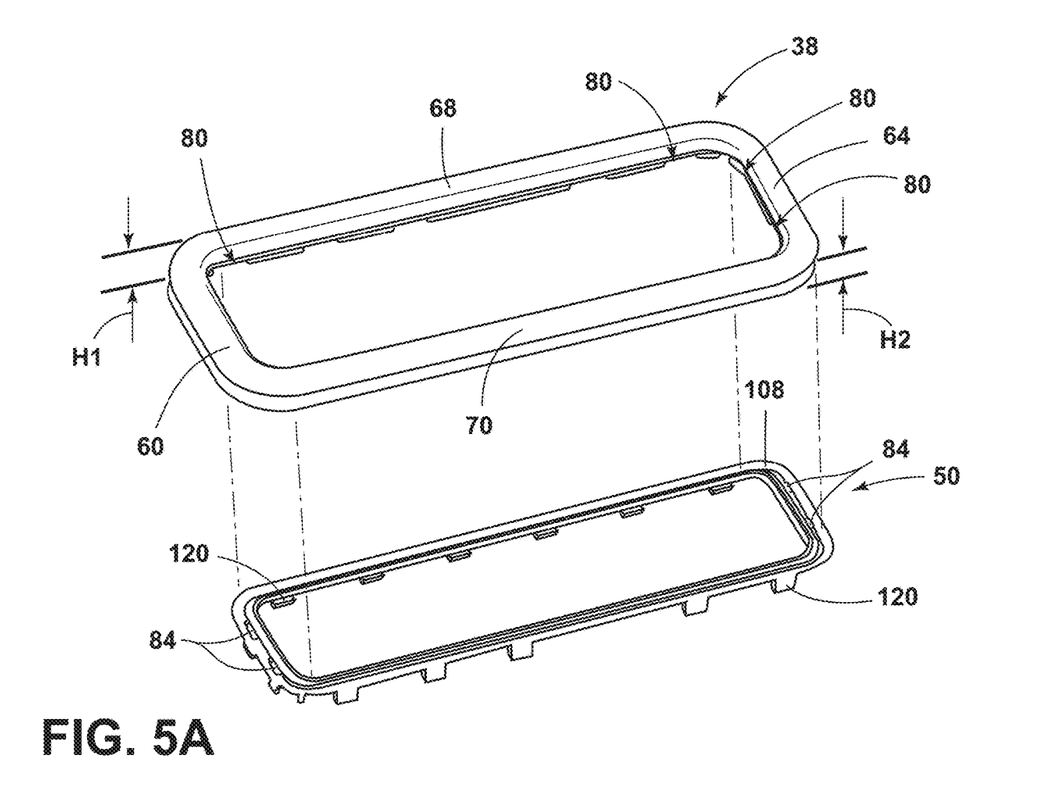
FIG. 5A is an exploded perspective view of an aspect of the gasket assembly of FIG. 5.

Referring now to FIGS. 5 and 5A, the gasket 38 may include a first lateral edge 60 and a second lateral edge 64. The first and second lateral edges 60, 64 may be joined by first and second longitudinal edges 68, 70. In various examples, the first and second lateral edges 60, 64 may be shorter than the first and second longitudinal edges 68, 70. The lengths of the first and second lateral edges 60, 64 and the first and second longitudinal edges 68, 70 typically depend on the configuration of the first and second openings 34, 36 (see FIGS. 2-4A). The first lateral edge 60 may span a first height H1 (or thickness) when measured from a top surface to a bottom surface of the gasket 38. The second lateral edge 64 may span a second height H2 (or thickness) when measured from the top surface to the bottom surface of the gasket 38. The second height H2 may be less than the first height H1 to provide a tapered decrease in height (or thickness) across each of the first and second longitudinal edges 68, 70. The first and second heights H1, H2 are selected to allow at least about 2 mm of compression of the second lateral edge 64 when the refrigerator door 18 is in the closed position. The compression may be between about 1 mm to about 3 mm when the door 18 is in the closed position. It will be understood that the tapered configuration of the gasket 38 between H1 and H2 may also be at least partially achieved by utilizing a gasket having a substantially continuous height (or thickness) and a tapered guide 50 or by utilizing the gasket 38 with the tapered longitudinal edge(s) 68, 70 in conjunction with a tapered guide 50. It will also be understood that the taper configuration of the gasket 38 may be at least partially achieved by tapering one or both of the first and second sloped surfaces 46, 56 to position the first lateral edge 60 of the gasket 38 at a greater height than the second lateral edge 64 of the gasket 38. The tapered sloped surface 46, 56 may alternatively determine the contact between the gasket 38 and the sloped surface 46, 56 such that the second lateral edge 64 is not substantially compressed and/or rolled prior to contact between the first lateral edge 60 and the sloped surface 46, 56. It will further be understood that any combination of a tapered sloped surface 46, 56, a tapered guide 50, and/or a tapered gasket 38 may be used without departing from the scope of the present disclosure.

Referring again to FIGS. 5 and 5A, as discussed elsewhere herein, the guide 50 may be positioned on one of the first sloped surface 46 and the second sloped surface 56. In various examples, the sloped surfaces 46, 56 may define a well 106 configured to at least partially receive the guide 50. The guide 50 may include a body 108. The body 108 may be configured to be operably coupled with one of the front portion 44 of the icebox 26 and the front portion 52 of the air duct 32, respectively. The body 108 may be sized to be received by the well 106 of the respective sloped surfaces 46, 56. The guide 50 is shaped to complement the shape of the first and second openings 34, 36. The guide 50 is positioned about the periphery of one of the first opening 34 and the second opening 36, respectively, to provide an anchor for the gasket 38. The guide 50 may provide a poka yoke feature for easy installation of the gasket 38. In some examples, the poka yoke feature may include a plurality of snaps 120 extending from the body 108 of the guide 50 to be engaged with spaces defined within the well 106. The poka yoke feature (e.g., the plurality of snaps 120 and corresponding spaces) is configured to prevent reverse installation of the gasket 38, which ensures proper positioning of the first and second lateral sides 60, 64 based on the first and second heights H1, H2.

The first and second longitudinal edges 68, 70 and the first and second lateral edges 60, 64 may include a plurality of connection wells 80 configured to receive connection posts 84 positioned on and extending from the body 108 of the guide 50. The gasket 38 may be operably coupled to the guide 50 when the connection posts 84 are received by one of the connection wells 80. The connection posts 84 may be any shape or style configured to couple the gasket 38 with the guide 50. The connection posts 84 may be any size, including varying sizes, depending on the configuration and size of the gasket 38. In various examples, the plurality of connection wells 80 may be a single connection well 80 configured to receive a single connection post 84 that extends along a periphery of the body 108 of the guide 50.

The difference between the first height H1 and the second height H2 is configured to prevent rolling of the gasket 38. Rolling of the gasket 38 is caused by excessive height on the lateral edge 60 or 64 that is closest to the hinge assembly 22. To prevent rolling, the gasket 38 is configured to be positioned about the periphery of one of the first opening 34 and the second opening 36 so that the second lateral edge 64 is positioned closer to the hinge assembly 22 than the first lateral edge 60 (see FIG. 3A). The variation in the heights H1, H2 of the first lateral edge 60 and the second lateral edge 64 is configured to provide uniform compression across the gasket 38 as the door 18 moves into the closed position. As the second lateral edge 64 comes into contact with the periphery of the other of the first opening 34 and the second opening 36, because of the tapered configuration of the gasket 38, the second lateral edge 64 is compressed contemporaneously or simultaneously with the first lateral edge 60. Contemporaneous or simultaneous engagement of the first and second lateral edges 60, 64 with the opposing opening serves to prevent this rolling from occurring. By preventing rolling of the gasket 38, it is possible to prevent leaks that may lead to a build-up of frost on the gasket 38, the prevention of which improves the sealing quality of the gasket 38.

In one embodiment, a refrigerator door assembly may comprise the refrigerator door 18 operably coupled to the refrigerator appliance 10 by a hinge assembly 22, the icebox 26 disposed on the refrigerator door 18, and defining the first opening 34, the air duct 32 disposed within the refrigerator appliance 10 defining the second opening 36, wherein the second opening 36 is configured to communicate with the first opening 34 when the refrigerator door 18 is closed. A gasket 38 is disposed about a periphery of one of the first opening 34 and the second opening 36. The gasket 38 comprises the first lateral edge 60 having the first height H1, the second lateral edge 64 having the second height H2, wherein the second height H2 is less than the first height H1. The first and second longitudinal edges 68, 70 may join the first lateral edge 60 and the second lateral edge 64, wherein the first and second longitudinal edges 68, 70 are tapered from the first height H1 to the second height H2. In other words, the first and second longitudinal edges 68, 70 may taper from the first height H1 to the second height H2.

According to one aspect, a refrigerator appliance may include a cabinet defining a refrigeration compartment. A door may be operably coupled with the cabinet by a hinge assembly and may be movable between an open position and a closed position. An icemaker may be positioned within the door. The icemaker may include an icebox defining a first opening. An air duct may be positioned within the refrigeration compartment and may be operably coupled with the cabinet. The air duct may define a second opening. The first opening may be configured to be positioned in communication with the second opening when the door is in the closed position. A gasket may be positioned about a periphery of one of the first opening and the second opening. The gasket may include a first lateral edge having a first height. A second lateral edge may have a second height. The second height may be less than the first height. The second lateral edge may be positioned proximate the hinge assembly.

According to another aspect, the icebox may include a body portion and a front portion. The front portion may include a first surface inclined upward toward a top edge of the door.

According to other aspects, the air duct may include a second surface inclined toward a front of the appliance. The second surface may be configured to abut the first surface when the door is in the closed position.

According to yet another aspect, the refrigerator appliance may further include a guide configured to be operably coupled with one of the icebox and the air duct. The guide may be shaped to be positioned about a periphery of one of the first and second openings, respectively.

According to other aspects, a longitudinal edge may extend between and may be integrally formed with the first and second lateral edges. The longitudinal edge may taper from the first height to the second height.

According to still other aspects, the second lateral edge may be compressed by about 1 mm to about 4 mm when the door is in the closed position.

According to another aspect, a refrigerator appliance may include a cabinet defining a refrigeration compartment. A door may be operably coupled with the cabinet by a hinge assembly. The door may include an inner surface. An icebox may be operably coupled with the inner surface. The icebox may include a front portion including a first sloped surface and defining a first opening. A body portion may be integrally formed with the front portion and may extend downward along the inner surface. An air duct may be positioned at least partially within the refrigeration compartment. The air duct may include a second sloped surface positioned substantially parallel with the first sloped surface when the door is in a closed position. The second sloped surface may define a second opening. A gasket may be positioned about a periphery of one of the first opening and the second opening. The gasket may include a longitudinal edge. The longitudinal edge may taper toward the hinge assembly.

According to yet another aspect, the gasket may further include a first lateral edge spaced apart from a second lateral edge. The first lateral edge may have a first height, and the second lateral edge may have a second height. The first height may be greater than the second height.

According to other aspects, the second lateral edge may be positioned proximate the hinge assembly.

According to still another aspect, the second height may provide about 1 mm to about 4 mm of compression when the door is in the closed position.

According to yet another aspect, the longitudinal edge may be integrally formed with the first and second lateral edges. The longitudinal edge may taper from the first height to the second height.

According to still other aspects, the refrigerator appliance may further include a guide coupled with one of the first sloped surface and the second sloped surface. The guide may define a plurality of connection posts.

According to another aspect, the gasket may define a plurality of connection wells. The plurality of connection wells may be configured to receive the plurality of connection posts.

According to still other aspects, the guide may be configured to engage with one of the first sloped surface and the second sloped surface.

According to yet another aspect, one of the first sloped surface and the second sloped surface may define a well configured to receive the guide.

According to other aspects, the first opening may be aligned with the second opening when the door is in the closed position.

According to another aspect, a gasket may be positioned on an icebox within a refrigerator appliance. The gasket may include a first lateral edge spaced apart from a second lateral edge. The first lateral edge may have a first height and the second lateral edge may have a second height. The first height may be greater than the second height. A longitudinal edge may extend between and may be integrally formed with the first and second lateral edges. The longitudinal edge may taper from the first height to the second height. The second lateral edge may be positioned proximate a hinge assembly of an appliance door.

According to still other aspects, the second height may provide about 1 mm to about 4 mm of compression when the appliance door is in a closed position.

According to yet another aspect, the first and second lateral edges and the longitudinal edge may define one or more connection wells.

According to other aspects, the first lateral edge may be substantially parallel with the second lateral edge.

It will be understood by one having ordinary skill in the art that construction of the described concepts, and other components, is not limited to any specific material. Other exemplary embodiments of the concepts disclosed herein may be formed from a wide variety of materials unless described otherwise herein.

For purposes of this disclosure, the term "coupled" (in all of its forms: couple, coupling, coupled, etc.) generally means the joining of two components (electrical or mechanical) directly or indirectly to one another. Such joining may be stationary in nature or movable in nature. Such joining may be achieved with the two components (electrical or mechanical) and any additional intermediate members being integrally formed as a single unitary body with one another or with the two components. Such joining may be permanent in nature, or may be removable or releasable in nature, unless otherwise stated.

It is also important to note that the construction and arrangement of the elements of the disclosure, as shown in the exemplary embodiments, is illustrative only. Although only a few embodiments of the present innovations have been described in detail in this disclosure, those skilled in the art who review this disclosure will readily appreciate that many modifications are possible (e.g., variations in sizes, dimensions, structures, shapes and proportions of the various elements, values of parameters, mounting arrangements, use of materials, colors, orientations, etc.) without materially departing from the novel teachings and advantages of the subject matter recited. For example, elements shown as integrally formed may be constructed of multiple parts, or elements shown as multiple parts may be integrally formed, the operation of the interfaces may be reversed or otherwise varied, the length or width of the structures and/or members or connector or other elements of the system may be varied, and the nature or numeral of adjustment positions provided between the elements may be varied. It should be noted that the elements and/or assemblies of the system may be constructed from any of a wide variety of materials that provide sufficient strength or durability, in any of a wide variety of colors, textures, and combinations. Accordingly, all such modifications are intended to be included within the scope of the present innovations. Other substitutions, modifications, changes, and omissions may be made in the design, operating conditions, and arrangement of the desired and other exemplary embodiments without departing from the spirit of the present innovations.

It will be understood that any described processes, or steps within described processes, may be combined with other disclosed processes or steps to form structures within the scope of the present disclosure. The exemplary structures and processes disclosed herein are for illustrative purposes and are not to be construed as limiting.

It is also to be understood that variations and modifications can be made on the aforementioned structures and methods without departing from the concepts of the present disclosure, and further, it is to be understood that such concepts are intended to be covered by the following claims, unless these claims, by their language, expressly state otherwise.

The above description is considered that of the illustrated embodiments only. Modifications of the device will occur to those skilled in the art and to those who make or use the device. Therefore, it is understood that the embodiments shown in the drawings and described above is merely for illustrative purposes and not intended to limit the scope of the device, which is defined by the following claims as interpreted according to the principles of patent law, including the Doctrine of Equivalents.

What is claimed is:

1. An icebox within a refrigerator appliance, the icebox comprising:
   a gasket assembly having tapered edges, the gasket assembly comprising:
      a first edge having a first thickness;
      a second edge having a second thickness, wherein the tapered edges extend between the first edge and the second edge;
      a gasket; and
      a guide comprising a poka yoke feature, wherein the gasket couples with the guide via the poka yoke feature, wherein the gasket defines a plurality of wells configured to respectively receive a plurality of connection posts, respectively, wherein the plurality of connection posts are formed by the guide.

2. The icebox of claim 1, wherein a difference in a thickness of the first edge and the second edge is defined by the gasket.

3. The icebox of claim 1, wherein a difference in a thickness of the first edge and the second edge is defined by the guide.

4. The icebox of claim 1, wherein the poka yoke feature of the guide comprises a plurality of snaps.

5. The icebox of claim 1, defining a first opening, wherein the gasket assembly outwardly extends from a periphery of the first opening.

6. The icebox of claim 1, further comprising:
   a front portion defining a surface with a slope, wherein the gasket assembly is coupled with the front portion at the surface having the slope.

7. The icebox of claim 6, wherein the icebox is configured to be coupled with an interior of an operable door.

8. The icebox of claim 7, wherein the gasket assembly outwardly extends from the surface at varying heights to define a periphery of the gasket assembly that is configured to be oblique to the surface when the door is in an open position, and wherein the periphery of the gasket assembly is configured to be substantially parallel to the surface when the door is in a closed position.

9. An icebox for a refrigerator appliance comprising:
   a cover defining a first opening, wherein a periphery of the first opening is coupled with a gasket assembly comprising:
      a first edge having a first thickness relative to the cover;
      a second edge having a second thickness relative to the cover, the first thickness being different than the second thickness;
      at least one edge having a tapered configuration, the at least one edge extending between the first edge and the second edge;
      a gasket; and
      a guide, wherein the guide extends between the gasket and the periphery of the first opening, and wherein the guide couples to the gasket and the periphery of the first opening via a poka yoke feature, wherein a difference in the first thickness of the first edge and the second thickness of the second edge is defined by the guide.

10. The icebox of claim 9, wherein the cover comprises:
   a front portion, the first opening being defined on the front portion; and
   a body portion.

11. The icebox of claim 10, wherein the front portion further defines a first sloped surface.

12. The icebox of claim 11, wherein front portion is configured to interface with an air duct of the refrigerator appliance, the air duct defining a second sloped surface that is complementary to the first sloped surface.

13. The icebox of claim 12, wherein the front portion is configured to interface with the air duct when a door of the refrigerator appliance is moved to a closed position.

14. The icebox of claim 13, wherein the gasket assembly is prevented from rolling at least partially by the at least one edge having the tapered configuration when the door is moved to the closed position.

15. The icebox of claim 14, wherein the gasket assembly is prevented from rolling at least partially by the poka yoke feature.

16. A refrigerator appliance comprising:
   an icebox comprising:
      a cover coupled with a gasket assembly, the gasket assembly comprising:
         a gasket having a tapered configuration with respect to the cover; and
         a guide, wherein the guide couples with the gasket and the cover via a poka yoke feature such that the guide extends between the gasket and the cover wherein the tapered configuration of the gasket relative to the cover is defined by the guide;
   a door movable between an open position and a closed position; and
   an air duct, wherein the gasket interfaces with the air duct when the door is moved to the closed position.

17. The refrigerator appliance of claim 16, wherein the cover further comprises:

a front portion sloping downwardly toward the refrigerator appliance, wherein the front portion defines a first opening.

18. The refrigerator appliance of claim 17, wherein the air duct defines:
a sloped surface complementary of the front portion when the door is moved to the closed position; and
a second opening complementary of the first opening when the door is moved to the closed position.

19. The refrigerator appliance of claim 18, wherein the tapered configuration of the gasket is configured to interface with a periphery of the second opening when the door is moved to the closed position.

* * * * *